(12) United States Patent
Pong

(10) Patent No.: US 7,861,055 B2
(45) Date of Patent: Dec. 28, 2010

(54) METHOD AND SYSTEM FOR ON-CHIP CONFIGURABLE DATA RAM FOR FAST MEMORY AND PSEUDO ASSOCIATIVE CACHES

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 95 days.

(21) Appl. No.: 11/228,059

(22) Filed: Sep. 16, 2005

(65) Prior Publication Data
US 2006/0277365 A1 Dec. 7, 2006

Related U.S. Application Data

(60) Provisional application No. 60/688,279, filed on Jun. 7, 2005.

(51) Int. Cl.
*G06F 12/02* (2006.01)
(52) U.S. Cl. .................. 711/170; 711/173; 711/129
(58) Field of Classification Search .......... 711/173, 711/170, 129
See application file for complete search history.

(56) References Cited

U.S. PATENT DOCUMENTS

| | | | | |
|---|---|---|---|---|
| 5,410,669 | A | * | 4/1995 | Biggs et al. ............. 711/118 |
| 5,761,715 | A | * | 6/1998 | Takahashi .............. 711/128 |
| 6,058,456 | A | * | 5/2000 | Arimilli et al. ........... 711/129 |
| 6,205,537 | B1 | * | 3/2001 | Albonesi ................ 712/43 |
| 6,604,174 | B1 | * | 8/2003 | Dean et al. .............. 711/131 |
| 6,606,686 | B1 | * | 8/2003 | Agarwala et al. ......... 711/129 |
| 2005/0080994 | A1 | * | 4/2005 | Cohen et al. ............ 711/118 |
| 2005/0246499 | A1 | * | 11/2005 | Saida et al. ............. 711/128 |
| 2006/0168390 | A1 | * | 7/2006 | Speier et al. ............ 711/5 |

* cited by examiner

*Primary Examiner*—Shane M Thomas
(74) *Attorney, Agent, or Firm*—McAndrews, Held & Malloy, Ltd.

(57) ABSTRACT

Aspects of a method and system for an on-chip configurable data RAM for fast memory and pseudo associative caches are provided. Memory banks of configurable data RAM integrated within a chip may be configured to operate as fast on-chip memory or on-chip level 2 cache memory. A set associativity of the on-chip level 2 cache memory may be same after configuring the memory banks as prior to the configuring. The configuring may occur during initialization of the memory banks, and may adjusted the amount of the on-chip level 2 cache. The memory banks configured to operate as on-chip level 2 cache memory or as fast on-chip memory may be dynamically enabled by a memory address.

22 Claims, 5 Drawing Sheets

METHOD AND SYSTEM FOR ON-CHIP CONFIGURABLE DATA RAM FOR FAST MEMORY AND PSEUDO ASSOCIATIVE CACHES

CROSS-REFERENCE TO RELATED APPLICATIONS/INCORPORATION BY REFERENCE

This application makes reference to, claims priority to, and claims benefit of U.S. Provisional Application Ser. No. 60/688,279 filed Jun. 7, 2005.

This application also makes reference to:

U.S. patent application Ser. No. 11/228,363 filed Sep. 16, 2005;

U.S. patent application Ser. No. 11/228,863 filed Sep. 16, 2005;

U.S. patent application Ser. No. 11/228,060 filed Sep. 16, 2005;

U.S. patent application Ser. No. 11/228,398 filed Sep. 16, 2005;

U.S. patent application Ser. No. 11/228,163 filed Sep. 16, 2005; and

U.S. patent application Ser. No. 11/228,362 filed Sep. 16, 2005.

Each of the above stated applications is hereby incorporated herein by reference in its entirety.

FIELD OF THE INVENTION

Certain embodiments of the invention relate to accessing data. More specifically, certain embodiments of the invention relate to a method and system for an on-chip configurable data RAM for fast memory and pseudo associative caches.

BACKGROUND OF THE INVENTION

In order to reduce cost of electronic equipments and/or reduce design cycle time, manufacturers design as much functionality on to a chip as possible. For example, the chip may comprise a processor, memory, and most of the circuitry required for a particular application, for example, digital signal processing for a cell phone. Some additional off-chip circuitry, for example, radio frequency (RF) circuitry to receive and transmit RF signals, may be required. Systems designed with these chips may generally be referred to as system-on-chip (SoC) designs.

Although SoC designs may comprise on-chip memory, for example, random access memory (RAM), more memory may be required than is available on the chip. Accordingly, there may be a caching system to access the off-chip memory. The caching system may comprise two levels of caches—level 1 (L1) and level 2 (L2). L2 cache may contain a subset of information in the off-chip main memory and L1 cache may contain a subset of information in the L2 cache. These may be considered to be examples of "inclusion property" where the main memory includes information in the L2 cache, and the L2 cache includes information in the L1 cache. In this regard, the inclusive L2 cache may have data in the L1 cache. When a processor requires data that is not in the L1 cache, the processor will attempt to fetch a copy of the data from the L2 cache. When the L2 cache receives a processor data request, it will provide a copy if it has a most recent copy of the requested data. Otherwise, the data will be fetched from the main memory.

However, there may be problems when a SoC embeds a symmetric multi-processing (SMP) system with, for example, four processors. Each of the four processors may have a L1 cache, and the four L1 caches may be supported by a unified L2 cache. When a processor needs data that is not in its L1 cache, a search may be made of the other L1 caches. Therefore, there may be duplicate data in various L1 caches when more than one processor needs the same data. Additionally, a classic problem of an SMP system is how to maintain cache coherence. Since each of the four L1 caches may keep a copy of a particular data, when a processor modifies its local copy, it may lead to data inconsistency with other copies in the other three L1 caches and the L2 cache.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method and system for an on-chip configurable data RAM for fast memory and pseudo associative caches, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an on-chip configurable data RAM for fast memory and pseudo associative caches. A pseudo associative cache may be where a tag, for example, a tag for a level 2 cache memory, need not necessarily refer to level 2 cache memory locations. Rather, the tag may refer to level 1 cache memory locations. Aspects of the method may comprise reconfiguring at least one of a plurality of memory banks integrated within a chip to operate as fast on-chip memory. A set associativity of the on-chip level 2 cache memory may be the same after reconfiguring as prior to reconfiguring. At least one of the memory banks may be configured as on-chip level 2 cache memory prior to the reconfiguring. The reconfiguring may be done during initialization of the memory banks, and may be dynamic. The amount of the on-chip level 2 cache may be adjusted by reconfiguring the memory banks.

The memory banks integrated within a chip configured as fast on-chip memory may be configured to operate as on-chip level 2 cache memory, and the amount of on-chip level 2 cache memory may be adjusted. The memory banks configured to operate as on-chip level 2 cache memory may be dynamically enabled by a memory address. A start address and an end address of the memory banks reconfigured to operate as the fast on-chip memory may be stored, for example, in appropriate registers. The plurality of memory banks reconfigured to operate as fast on-chip memory may be dynamically enabled based on a memory address.

Figure 1:
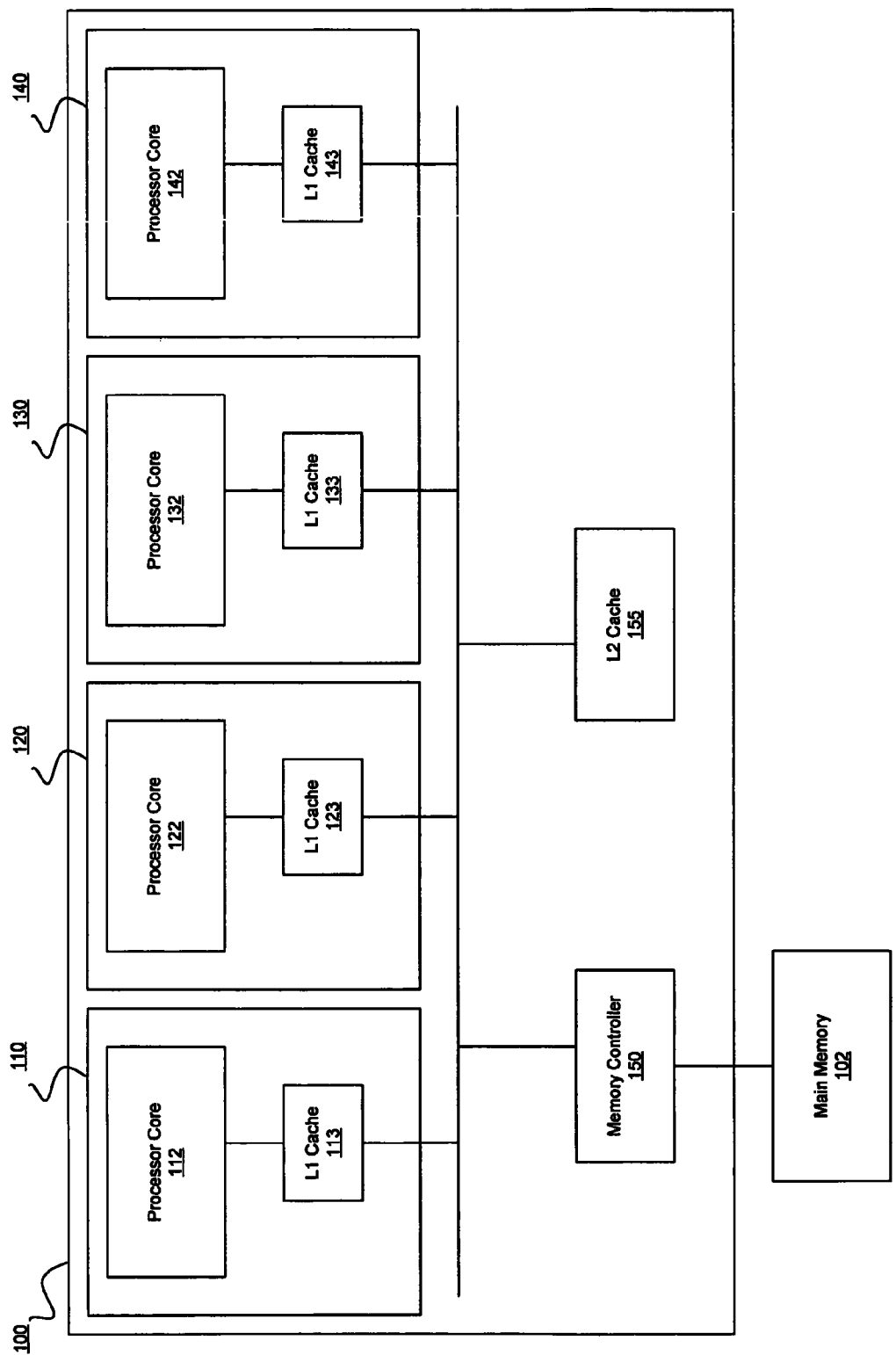
FIG. 1 is a block diagram of an exemplary System on Chip (SoC) with four processors supported by a unified level 2 cache, which may be utilized in connection with an embodiment of the invention.

FIG. 1 is a block diagram of an exemplary System-on-Chip (SoC) with four processors supported by a unified level 2 cache, in connection with an embodiment of the invention. Referring to FIG. 1, there is shown a SoC 100 and a main memory block 102. The SoC 100 may comprise processor blocks 110, 120, 130, and 140, a memory controller 150, and a level 2 (L2) cache 155. The processor block 110, 120, 130, and 140 may each comprise a processor core 112, 122, 132, and 142, respectively, and a level 1 (L1) cache 113, 123, 133, and 143, respectively.

The exemplary SoC 100 may comprise four processors, each with its own respective local L1 cache 113, 123, 133, and 143. The four L1 caches 113, 123, 133, and 143 may be supported by the L2 cache 155. The L2 cache 155 may contain a subset of information in the off-chip main memory block 102, and each of the L1 caches 113, 123, 133, and 143 may contain a subset of information in the L2 cache 155. These may be considered to be examples of "inclusion property" where the main memory block 102 includes information in the L2 cache 155, and the L2 cache 155 includes information in the L1 caches 113, 123, 133, and 143. Accordingly, the inclusive L2 cache 155 may have same data that is in the L1 caches 113, 123, 133, and 143. The multiple processors, for example, the processors 110, 120, 130, and 140, may each keep a copy of data from a memory location in the main memory block 102 in their respective local L1 caches 113, 123, 133, or 143.

When a processor, for example, the processor 110, modifies its local copy of data, there may exist a data inconsistency between the data in the processor 110 and the corresponding data in the processors 120, 130, and 140. That is, the processors 110, 120, 130, and 140 may have different values for the same memory location. A cache coherence protocol may prevent data inconsistency. For example, the cache coherence protocol may stipulate that when a cache does not have a copy of an interested memory location, the caching status for the memory location may be in an Invalid state (I-state). Reads from a memory location in a cache that may be in I-state may be a cache miss. When multiple copies of data from a main memory, for example, the main memory 102, exist in local L1 caches 113, 123, 133, or 143, all copies may be identical to the main memory copy. When this occurs, the cached copies may each be in a Shared state (S-state).

In order to ensure coherence, before a processor, for example, the processor 110, may modify its copy of the data in its local L1 cache, for example, the L1 cache 113, it may procure an exclusive copy by invalidating all other copies in the system. Accordingly, the modified data in the L1 cache 113 may be in the Modified state (M-state) and the corresponding data in the other L1 caches 123, 133, and 143 may be in the I-state. For example, when the L1 cache 123 has a cache miss, the L1 cache 113 may provide the corresponding data that may be in the M-state. The L1 caches 113 and 123 may then be in the S-state while the L1 caches 133 and 143 may be in the I-state. When modified data is provided from one L1 cache to another L1 cache, the same data may be written back to the main memory 102.

In a system of N caches, there may only be two possible global states. The first global state G1 may be (M-state, I-state, I-state, ..., I-state) and the second global state G2 may be (S-state, S-state, ..., S-state, I-state, I-state, ..., I-state). The first global state G1 may only allow one cache may be in the Modified state, and all other caches may be in the Invalid state. The second global state G2 may occur when some caches may be in the Shared state with identical copies of data, and the remaining caches may be in the Invalid state because they may not have that data.

The L2 cache 155 may additionally filter invalidation requests. For example, during the transition from the global state G2 to the global state G1, the processor block 110 may modify the data. But, before modifying the data, the processor block 110 may need to invalidate the other copies of the data in the other L1 caches 123, 133, and 143. Accordingly, the L1 cache 113 may send an invalidation request to the L2 cache 155. The L2 cache 155 may then send invalidation requests only to those processors in the S-state. The other processors may already be in the I-state, and therefore, they may not need to be sent invalidation requests. This may avoid unnecessary interference to processor activity.

Figure 2:
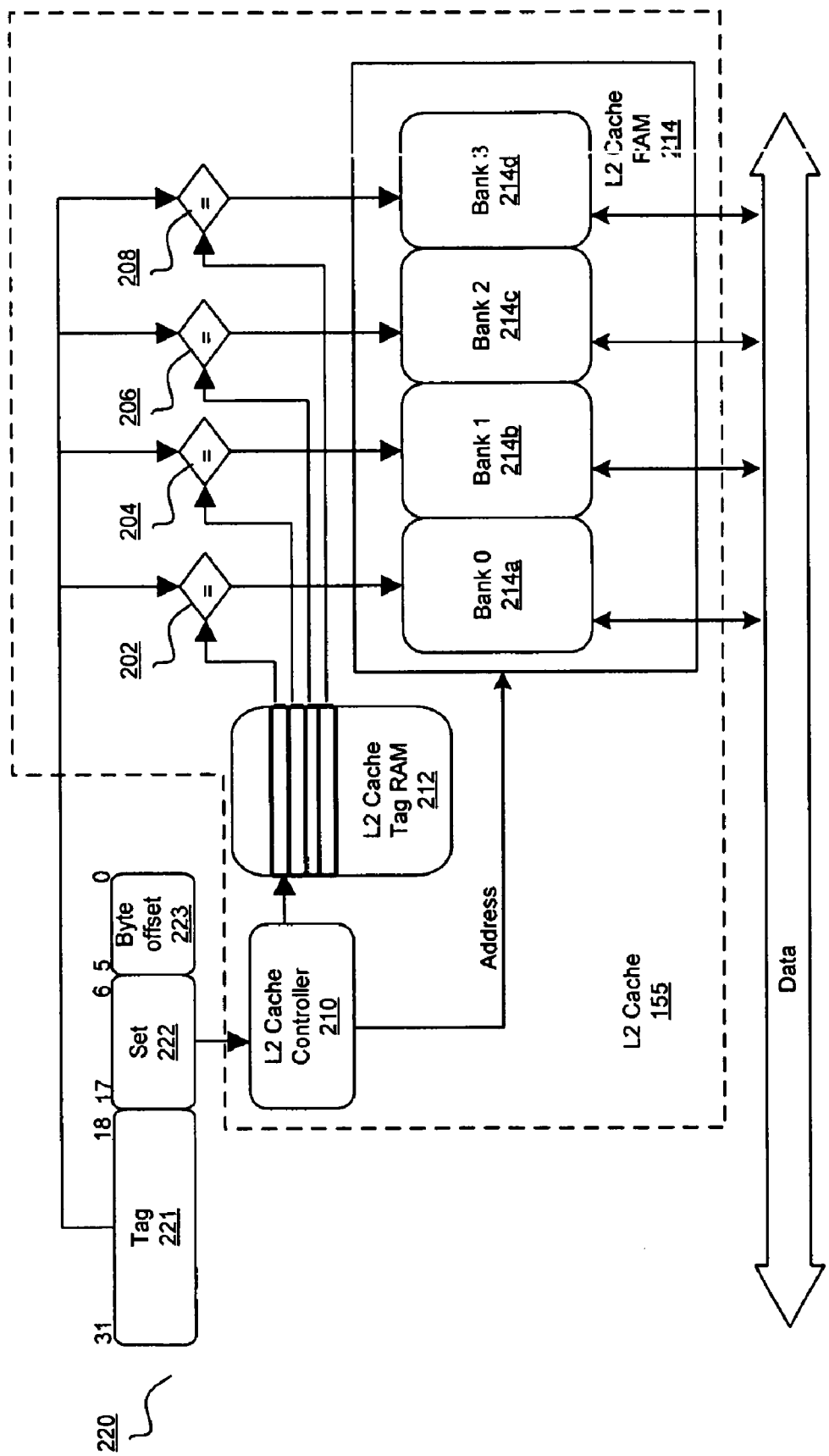
FIG. 2 is a block diagram illustrating an exemplary 4-way set-associative level 2 cache, which may be utilized in connection with an embodiment of the invention.

FIG. 2 is a block diagram illustrating an exemplary 4-way set-associative level 2 cache, which may be utilized in connection with an embodiment of the invention. Referring to FIG. 2, there is shown the L2 cache 155 that comprises tag compare blocks 202, 204, 206, and 208, a L2 cache controller 210, a L2 cache tag memory 212, and a L2 cache memory 214. There is also shown an illustration of a memory address 220 that may comprise a tag address 221, a set address 222, and a byte offset address 223. The L2 cache memory 214 may comprise memory banks Bank0 214a, Bank1 214b, Bank2 214c, and Bank3 214d.

The tag compare blocks 202, 204, 206, and 208 may comprise suitable circuitry and/or logic that may be adapted to compare two addresses. When the addresses match, an enable signal may be asserted to enable access to a memory bank. For example, the tag compare blocks 202, 204, 206, and 208 may communicate an enable signal to the memory banks Bank0 214a, Bank1 214b, Bank2 214c, and Bank3 214d.

The L2 cache controller 210 may comprise suitable circuitry, logic, and/or code that may be adapted to receive a memory address and access the L2 cache memory 214 to read or write data. The L2 cache controller 210 may also indicate a cache miss to a memory controller, for example, the memory controller 154.

The L2 cache tag memory 212 may comprise suitable circuitry and/or logic to store four tag addresses at each addressable memory location. Each addressable memory location in the L2 cache tag memory 212 may be addressed by the set address from the L2 cache controller 210.

A cache may be configured as a set-associative cache. A N-way set-associative cache may comprise N banks of memory. Accordingly, the L2 cache 155 that comprises the four memory banks Bank0 214a, Bank1 214b, Bank2 214c, and Bank3 214d may be a 4-way set-associative cache. A memory address, for example, the memory address 220, may address data that may be in one of the four memory banks Bank0 214a, Bank1 214b, Bank2 214c, and Bank3 214d. A memory address may be partitioned to various portions when using a cache. For example, the 32-bit memory address 220 may be partitioned to the 14-bit tag address 221, the 12-bit set address 222, and the 6-bit byte offset address 223. The 6-bit byte offset address 223 may indicate that a line of data may comprise 64 bytes. The line size may be a minimum number of bytes that may be transferred between a main memory, for example, the main memory block 102, and a cache, for example, the L2 cache 155.

The four lines of data in the corresponding memory locations of the four memory banks Bank0 214a, Bank1 214b, Bank2 214c, and Bank3 214d may be referred to as a set. Accordingly, the 12-bit set address 222 may be able to address 4K locations in the L2 cache tag memory 212. Each of the 4K locations may be able to store all four tags for the four memory banks. Each tag may be used to enable a memory bank in order to access data in that memory bank.

In operation, if data is required from memory, and the data is not in the L1 caches 113, 123, 133, and 143, the L2 cache 155 may be able to supply the data. Accordingly, the L2 cache controller 210 may use the data memory address 220 for L2 cache access. The 32 bits of the memory address 220, or some portion of the memory address 220 if byte addressing is not desired, may be communicated to the four memory banks Bank0 214a, Bank1 214b, Bank2 214c, and Bank3 214d. As a parallel operation, the 12-bit set address 222 may be used to address a tag RAM, for example, the L2 cache tag memory 212.

The L2 cache tag memory 212 may comprise 4K storage locations. Each of the 4K storage locations may store four tag addresses that may correspond to the four memory banks Bank0 214a, Bank1 214b, Bank2 214c, and Bank3 214d. When one of the four tag addresses from the L2 cache tag memory 212 matches the tag address 221, a cache hit may occur. This may occur in one of the tag compare blocks 202, 204, 206, and 208 asserting its corresponding memory bank enable signal. When none of the tag addresses from the L2 cache tag memory 212 matches the tag address 221, a cache miss may be indicated, for example, to the memory controller 150. The memory bank that may correspond to the asserted memory bank enable signal may decode the memory address 220. The enabled memory bank may then output the desired data on to the data bus.

Each L2 cache tag memory 212 entry may comprise a valid bit that may indicate whether the entry is valid, a 14-bit tag, a 4-bit vector that may indicate whether any of the four L1 caches 113, 123, 133, or 143 may also have a copy of the same memory line, and a dirty bit that may specify if a L1 cache copy may have been modified with respect to the data in the L2 cache memory 214. However, one problem is that the memory utilization may be low. For example, the L2 cache may contain data that may have been modified in an L1 cache. This modified data may be referred to as a dirty data, and the corresponding dirty bit may be set. Accordingly, the L2 may keep track of the dirty line, and when a processor requests data in that line, the L2 may direct the miss request to the L1 cache that may have the dirty data. An extreme case may occur where all cached memory lines may be in the dirty state in the L1 caches. In that event, the clean data in the L2 cache memory 214 may not be used at all and removing portions of the L2 cache memory 214 may not affect performance. The removed portion may then be used by the processor as additional general purpose memory, and the increased general purpose memory may improve performance of the processor.

Figure 3:
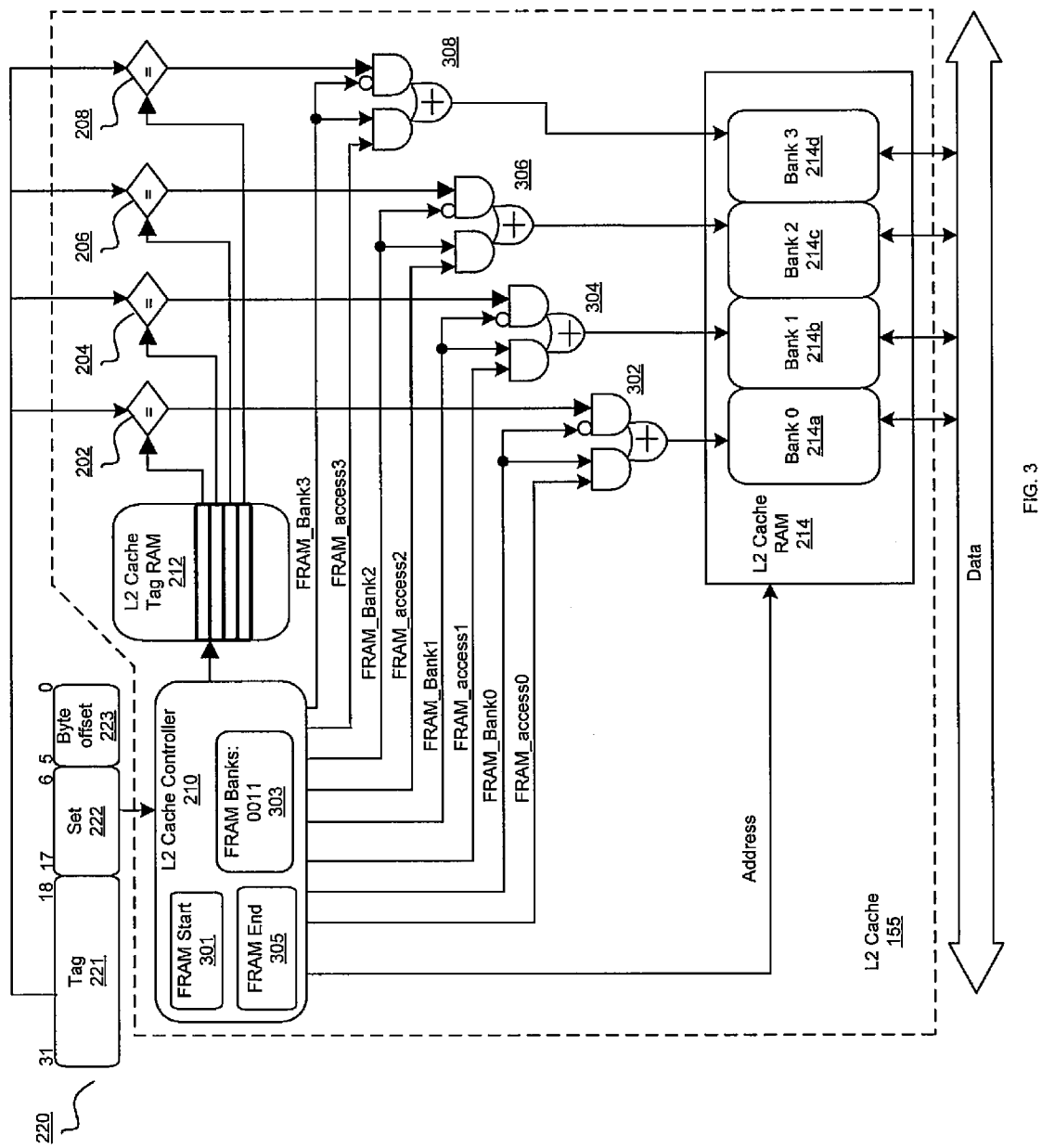
FIG. 3 is a block diagram illustrating an exemplary level 2 cache controller with configurable cache memory, in accordance with an embodiment of the invention.

FIG. 3 is a block diagram illustrating an exemplary level 2 cache controller with configurable cache memory, in accordance with an embodiment of the invention. Referring to FIG. 3, there is shown the L2 cache 155 that comprises the tag compare blocks 202, 204, 206, and 208, the L2 cache controller 210, the L2 cache tag memory 212, and the L2 cache memory 214. There is also shown an illustration of the memory address 220 that may comprise the tag address 221, the set address 222, and the byte offset address 223. The L2 cache controller 210 may comprise a fast RAM (FRAM) Start register 301, an FRAM End Register 302, and an FRAM Banks Register 303. The L2 cache memory 214 may comprise memory banks Bank0 214a, Bank1 214b, Bank2 214c, and Bank3 214d.

The FRAM Start Register 301 may comprise suitable logic and/or circuitry that may be adapted to store an address where fast memory space may start. The fast memory may be the memory banks Bank0 214a, Bank1 214b, Bank2 214c, and/or Bank3 214d that may be allocated as fast memory. The FRAM End Register 302 may comprise suitable logic and/or circuitry that may be adapted to store an address where fast memory space may end. The FRAM Banks Register 303 may comprise suitable logic and/or circuitry that may be adapted to store, for example, a 4-bit vector that may specify which banks may be configured as fast memory. The AND-OR gates 302, 304, 306, and 308 may comprise suitable logic that may be adapted to allow the output of two 2-input ANDs to be ORed together. The access enable signal to the high-speed on-chip RAM bank k may be defined as, for example:

enable_$k$=(hit $k$ & ~FRAM Bank $k$)+
(FRAM access $k$ & FRAM Bank $k$)

and each enable_k may be implemented by, for example, the AND-OR gates 302, 304, 306, and 308.

In operation, the L2 cache memory 214 may comprise 1 MB of RAM that may be, for example, partitioned to four banks of memory, where each memory bank may be 256 KB in size. In this example, the first two banks of the L2 cache memory 214, for example, the memory banks Bank0 214a and Bank1 214b, which may total 512 KB of memory, may be used for L2 cache. The third and fourth banks of the L2 cache memory 214, Bank2 214c and Bank3 214d, which may total 512 KB of memory, may be configured as fast memory allocated to the processors, for example, the processor blocks 110, 120, 130, and 140. In effect, the L2 cache memory 214 may have been reduced to 512 KB while an additional 512 KB of general purpose memory may have been allocated to the processor blocks 110, 120, 130, and 140. The memory banks allocated as general purpose memory may be referred to as fast memory since they may be on-chip.

An application may configure the memory size during memory initialization, for example, during boot-up or reset, to reduce the memory allocated for L2 caching. The application may also monitor the processor's performance and/or cache hit rate, and using an algorithm that may be design and/or implementation dependent, may dynamically adjust the memory allocated for L2 caching. For example, if the performance is sufficient and/or the cache miss rate is low, the L2 cache size may be reduced further. Conversely, if the performance is insufficient and/or the hit rate is low, the L2 cache size may be increased.

The L2 cache controller 210 may use bit values in the FRAM Banks Register 303 to enable the appropriate AND gate of each of the AND-OR gates 302, 304, 306, and 308. For example, the memory banks Bank0 214a and Bank1 214b may be configured for caching and the memory banks Bank2 214c and Bank3 214d may be configured as fast memory. Accordingly, a bit pattern in the FRAM Banks Register 303 may be, for example, 1100, where the least significant two bits may be set to a logic zero to indicate that the lowest two memory banks Bank0 214a and Bank1 214b may not be configured as fast memory. Similarly, the most significant two bits may be set to a logic one to indicate that the highest two memory banks Bank0 214c and Bank1 214d may be configured as fast memory. In this manner, the outputs of the AND-OR gates 302 and 304 may be dependent on the outputs of the tag compare blocks 202 and 204. Additionally, the outputs of the AND-OR gates 306 and 308 may be dependent on the outputs of the FRAM_access signals.

When the L2 cache controller 210 receives a request address, it may determine whether the requested address is in the fast memory region. This may be accomplished by comparing the requested address with the start and end addresses of the fast memory region in the FRAM Start Register 301 and the FRAM End Register 302. If the access is to the fast memory region, the L2 cache controller 210 may assert an FRAM_access signal to turn on the correct data bank. Accordingly, if the corresponding bank is configured as fast memory in the FRAM Banks Register 303, the corresponding memory bank may be enabled. If the access is not in the fast memory region, the memory banks allocated for L2 caching may be searched for data in the normal method of selecting the set address and comparing the tags.

For a processor read that may result in a miss from its L1 cache, data may be loaded from the L2 cache 155. If the L2 cache 155 also indicates a miss, then the data may be loaded from the main memory, for example, the main memory block 102. If the L2 cache 155 indicates a hit, but the hit entry may indicate that another L1 cache has a dirty copy. The dirty L1 cache may then be forced to do a write back to provide the most recently modified data to the processor which originated the cache request. Accordingly, all cached copies may be in the Shared state.

During a processor write to the L1 cache, if the line to be written to is found in the dirty state in the cache, it may be referred to as a write hit. Otherwise, it may be referred to as a write miss. If the dirty bit is already set for a write hit, then the L1 cache may be updated. If the dirty bit is not set, then the L2 cache 155 may be notified. The L2 cache controller 210 may then multicast invalidation request to all other L1 caches that may have a copy of the data that may have been updated by a processor. The L2 cache 155 may mark the entry corresponding to the writing processor as dirty, and make note of that processor so that a future request for that data may be forwarded to that processor. A write miss may be handled in the same way as the write hit on a clean line.

Upon a read miss to the L1 cache, an existing line may be removed in order to make room for a new memory line from the L2 cache 155 that may include the requested data. If the line chosen to be removed is clean, it may be overwritten by the new line. However, if the line chosen to be removed is dirty, the chosen line may need to be written back to the L2 cache 155.

Figure 4B:
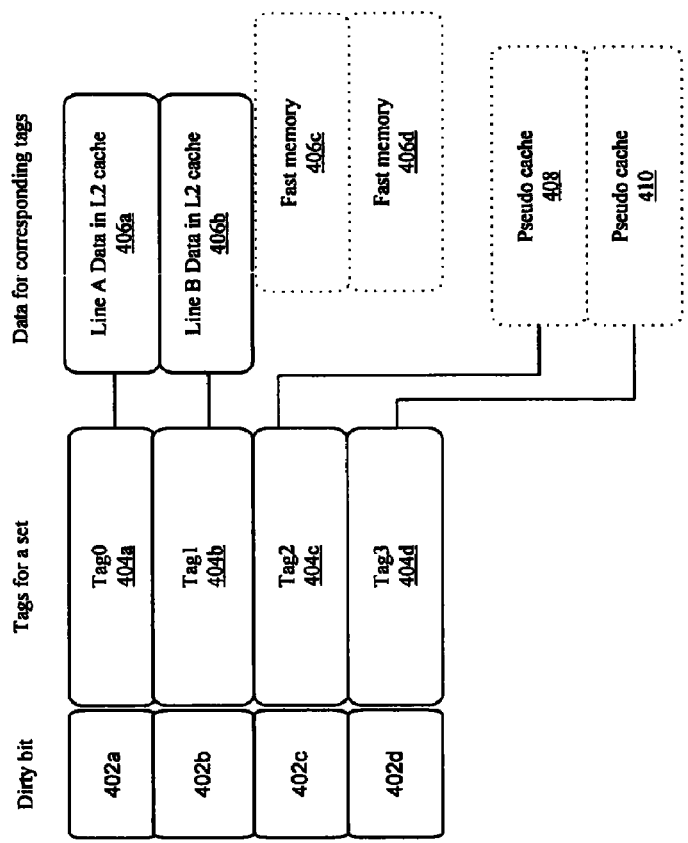
FIG. 4b is a diagram illustrating exemplary usage of tags for pseudo cache, in accordance with an embodiment of the invention.
Figure 4A:
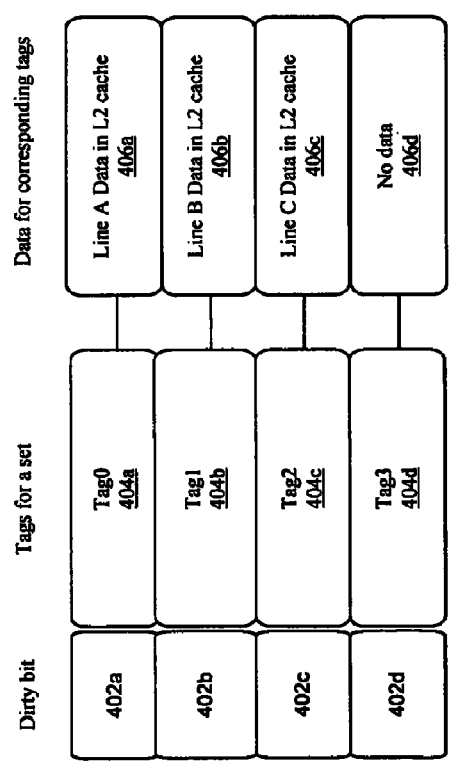
FIG. 4a is a diagram illustrating exemplary usage of tags in a L2 cache, in accordance with an embodiment of the invention.

FIG. 4a is a diagram illustrating exemplary usage of tags in a L2 cache, in accordance with an embodiment of the invention. Referring to FIG. 4a, there is shown for a same set, dirty bits 402a, 402b, 402c, and 402d, tag entries 404a, 404b, 404c, and 404d, and data locations 406a, 406b, 406c, and 406d.

The first three tag entries 404a, 404b, 404c of a set in the L2 cache RAM, for example, the L2 cache tag memory 212, may have corresponding data, for example, in the data locations 406a, 406b, 406c in the L2 cache memory, for example, the L2 cache memory 214. The fourth cache tag entry 404d of the same set may not have a corresponding data, for example, in the data location 406d in the L2 cache memory 214. Accordingly, a read request with the fourth tag entry 404d may result in trying to complete a fill by finding an available entry in the first three data locations 406a, 406b, 406c.

In an exemplary embodiment of the invention, if three data locations 406a, 406b, 406c are filled by lines A, B and C, we may try to find if any line has a corresponding dirty bit 402a, 402b, and 402c set. If so, that may mean that a L1 cache, for example, the L1 cache 123, may have a "dirtier" copy of the corresponding line. For such a case, the data in the L1 cache 123 may be the latest modified data. For example, if the dirty bit 402b associated with the line B data 406b is set, that line may be copied from the associated L1 cache 123 into the fourth data location 406d, as well as to the L1 cache of the fourth processor, for example, the L1 cache 143. The L2 cache controller, for example, the L2 cache controller 210, may update the status of each L1 data entry to keep track of which L1 cache may be in the Modified state. This may indicate the latest modified data. Since the data was copied from the L1 cache 123, the memory bank Bank3 214d of the L2 cache memory 214 may not be needed. If this trend holds true generally, then the memory bank Bank3 214d of the L2 cache memory 214 may better serve as a fast memory bank. The fast memory bank may be used as a general purpose RAM by the processor cores 112, 122, 132, and 142.

Generally, data in the L1 cache may be a subset of data in the L2 cache, and the data in the L2 cache may be a subset of data in the main memory. When an L1 cache has the most recent data, the other copies of this data in the other L1 caches, the L2 cache and the main memory may all be obsolete. The L2 cache may get updated when the L1 cache writes back to the L2 cache. The L1 cache may write back when it needs to make room for new data. Similarly, the L2 cache may write back to the main memory when the L2 cache needs to make room for new data. Overall, in instances when a L1 cache has a modified line, the corresponding line in the L2 cache may not be used since it may be obsolete. Thus the storage space in the L2 cache for that line may be wasted. In instances when the L1 cache has a clean line, it may be consistent with the copy in the L2 cache. In such instances, the L1 cache may arbitrarily drop its copy without notification to the L2 cache. This may be done to make room for new data. The L1 cache may at a later time re-load from the L2 cache, as needed. Therefore, the L2 cache may keep a copy of all clean data.

Accordingly, if an application exhibits a pattern where the L1 caches contain modified data, and therefore, the L2 cache data may not be used, the L2 cache may be re-configured so that some of its storage may be used as a general purpose fast memory rather than as a L2 cache. The fast memory may be used for many purposes. For example, it may be used by network interface to separate transmission control protocol/Internet protocol (TCP/IP) headers and payload of network packets. The header may be stored to the fast memory so that the software TCP/IP stack may have shorter latency in accessing the packet headers, as compared to reading them from the external main memory. In another example, the fast memory may be used for keeping important data structures such as the transport control block (TCB) for TCP sessions.

From an addressing point of view, the fast memory may be transparent to the software. Software may still issue READ/WRITE operations to memory locations. The memory address may go to both the L2 cache controller, for example, the L2 cache controller 210, and the memory controller, for example, the memory controller 150, to be decoded, and one of the controllers may access data that may correspond to the memory address.

FIG. 4b is a diagram illustrating exemplary usage of tags for pseudo cache, in accordance with an embodiment of the invention. Referring to FIG. 4b, there is shown for a same set, dirty bits 402a, 402b, 402c, and 402d, tag entries 404a, 404b, 404c, and 404d, and L2 cache memory 214 locations 406a and 406b, and fast memory 406c and 406d. There is also shown pseudo cache locations 408 and 410 that may be L1 cache memory locations.

In an exemplary embodiment of the invention, there may be two data locations 406a and 406b in the L2 cache memory 214 that may be filled by data lines A and B. These two data locations may correspond to the tag entries 404a and 404b. A third and fourth tag entries 404c and 404d, which may no longer have L2 cache memory locations associated with them, may instead point to L1 cache locations. These L1 cache locations may have data that may have been modified with respect to the corresponding data in the L2 cache. The L2 data that may correspond to the modified L1 cache data may be discarded in order to free additional L2 cache data locations. Accordingly, the set associativity may be the same after reducing the number of L2 cache memory banks as before reducing the number of L2 cache memory banks.

Other embodiments of the invention may allow a N-way set associativity that may be larger than the number of L2 cache memory banks. For example, if a L2 cache has 4 memory banks 214a, 214b, 214c, and 214d, there may be an 8-way set associative L2 cache implemented. A result may be that there may be eight tag entries for each set address. Four tag entries may correspond to the four L2 memory banks 214a, 214b, 214c, and 214d, and four tag entries may correspond to pseudo L2 cache. The pseudo L2 cache may be the data locations in the L1 cache that may have a more recently modified data than the corresponding data in the L2 cache. This embodiment may also allow configuring a portion of the memory banks as fast memory.

Figure 5:
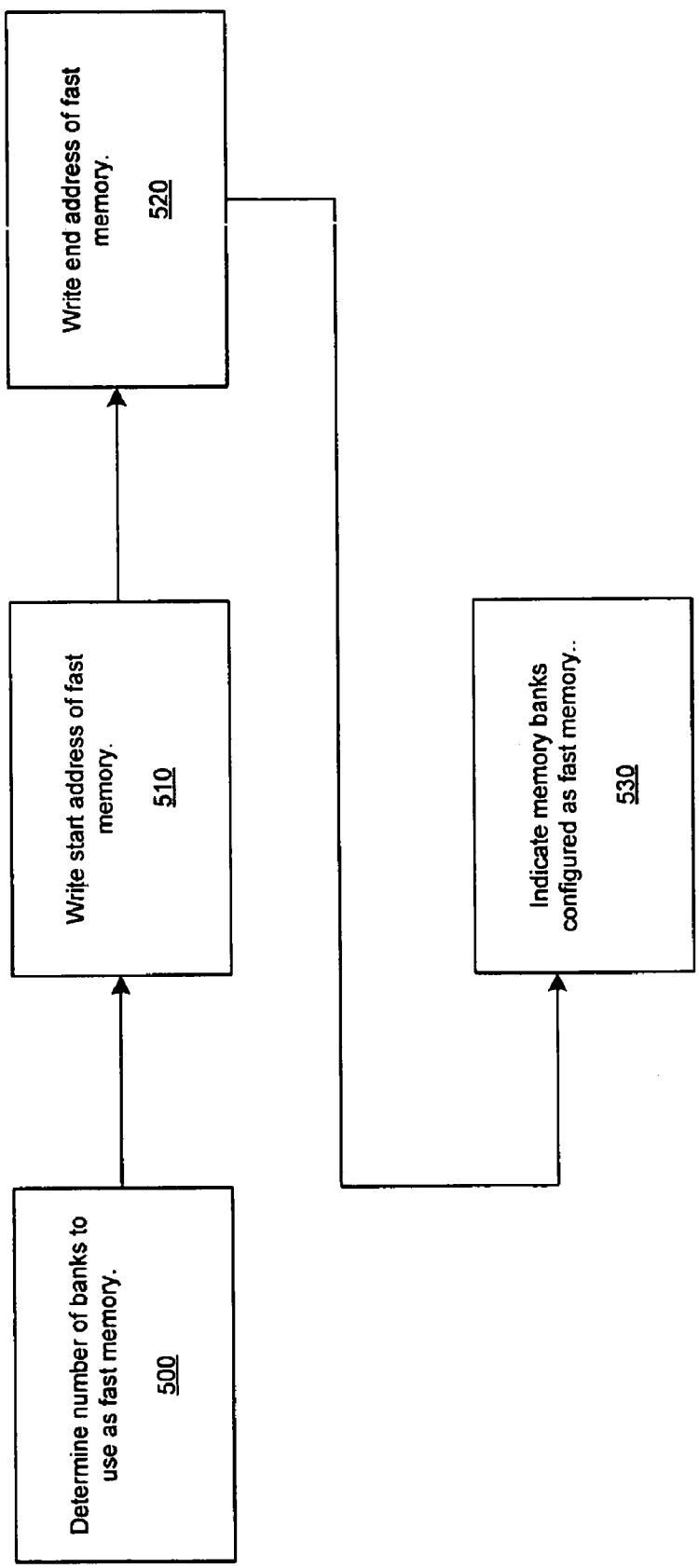
FIG. 5 is a flow diagram illustrating an exemplary routine for configuring memory for use as cache memory or fast memory, in accordance with an embodiment of the invention.

FIG. 5 is a flow diagram illustrating an exemplary routine for configuring memory for use as cache memory or fast memory, in accordance with an embodiment of the invention. In step 500, the number of banks to be configured as fast memory may be determined. In step 510, the starting address of the fast memory may be written to the Start register 301. In step 520, the end address of the fast memory may be written to the FRAM End Register 302. In step 530, the banks that may be configured as fast memory may be indicated by setting appropriate bits in the FRAM Banks Register 303.

Referring to FIG. 5, and with respect to FIGS. 1 and 3, there is shown a plurality of steps 500 to 530 that may be utilized for configuring on-chip cache memory as fast memory. The memory configuration may be, for example, controlled by one of the processor blocks 112, 122, 132, or 142. In step 500, a determination may be made to configure a portion of on-chip cache memory as fast memory. This determination may be application specific, and may be dependent on observed and/or measured memory use by the application. The memory use may take in to account various factors, such as, for example, L1 cache miss rate, L2 cache miss rate, and L1 data fill rate from another L1 cache. Since memory usage by an application may not vary much during its power-on period, there may not be a need to change memory configuration during the power-on period. However, the invention need not be so limited. For example, an embodiment of the invention may allow writing back data in the L1 and L2 caches to the main memory 102, temporarily halting the processors not involved in the memory configuration, for example, the processor blocks 110, 120, 130 and/or 140, and reconfiguring the number of banks of on-chip memory as fast memory.

In step 510, determination of the banks of on-chip memory to configure as fast memory may allow determination of the starting address of the fast memory. The starting address of the fast memory may be written to the FRAM Start register 301. Similarly, in step 520, the end address of the fast memory may be determined and written to the FRAM End Register 302. When a memory request is made with a memory address, the L2 cache controller 210 may compare the memory address with the addresses in the FRAM Start register 301 and the FRAM End Register 302. The L2 cache controller 210 may then assert the appropriate FRAM bank access signal FRAM_access0, FRAM_access1, FRAM_access2, or FRAM_access3. Although the physical fast memory blocks may not have to be contiguous, an embodiment of the invention that uses one FRAM Start register 301 and one FRAM End Register 302 may need to have the logical address space of the fast memory be contiguous. However, the invention need not be so limited. For example, multiple FRAM Start registers and FRAM End Registers may allow non-contiguous fast memory address spaces.

In step 530, the banks that may be configured as fast memory may be indicated as such by setting appropriate bits in the FRAM Banks Register 303. These bits may be utilized to assert the FRAM bank enable signals FRAM_Bank0, FRAM_Bank1, FRAM_Bank2, or FRAM_Bank3. For example, the memory banks Bank0 214a and Bank1 214b may be configured for caching and the memory banks Bank2 214c and Bank3 214d may be configured as fast memory. Accordingly, the bit pattern in the FRAM Banks Register 303 may be, for example, 1100, where the list significant two bits may be set to a logic zero to indicate that the lowest two memory banks Bank0 214a and Bank1 214b may not be configured as fast memory. Similarly, the most significant two bits may be set to a logic one to indicate that the highest two memory banks Bank0 214c and Bank1 214d may be configured as fast memory. In this manner, the outputs of the AND-OR gates 302 and 304 may be dependent on the outputs of the tag compare blocks 202 and 204. Additionally, the outputs of the AND-OR gates 306 and 308 may be dependent on the outputs of the FRAM_access signals.

Although the four members of a set in the L2 cache may have been described as being located on four banks of memory, where each bank may be separately enabled, the invention need not be so limited. For example, an embodiment of the invention may configure memory such that all four members of a set may be on the same memory bank. In this regard, regardless of how many banks may be configured as fast memory, only one bank may need to be enabled to access all four set members. This may result in power savings because fewer memory devices may need to be enabled. Additionally, different embodiments of the invention may utilize different number of members in a set.

At least one of a plurality of memory banks, for example, memory banks Bank0 214a, Bank1 214b, Bank2 214c, and Bank3 214d, of configurable data RAM integrated within a chip, and configured as on-chip level 2 cache memory, may be reconfigured to operate as fast on-chip memory. The reconfiguring may be done during initialization of the memory banks Bank0 214a, Bank1 214b, Bank2 214c, and Bank3 214d, and may be dynamic. The amount of the on-chip level 2 cache may be adjusted by reconfiguring the memory banks Bank0 214a, Bank1 214b, Bank2 214c, and Bank3 214d.

The memory banks integrated within a chip configured as fast on-chip memory may be configured to operate as on-chip level 2 cache memory, and the amount of on-chip level 2 cache memory may be adjusted. The memory banks Bank0 214a, Bank1 214b, Bank2 214c, or Bank3 214d configured to operate as on-chip level 2 cache memory may be dynamically enabled by a memory address. A start address and an end address of the memory banks Bank0 214a, Bank1 214b, Bank2 214c, or Bank3 214d reconfigured to operate as fast on-chip memory may be stored, for example, in appropriate registers. The registers may be, for example, the FRAM Start register 301 and the FRAM End Register 302. The memory banks Bank0 214a, Bank1 214b, Bank2 214c, or Bank3 214d reconfigured to operate as fast on-chip memory may be dynamically enabled based on a memory address.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for configuring memory, the method comprising:
    monitoring a cache hit rate of a processor;
    dynamically configuring one or more of a plurality of memory banks integrated within a chip to operate as fast on-chip memory based on said monitoring and based on one or more of a determined start address, a determined end address, and a corresponding one or more of a plurality of fast memory configuration bits;
    dynamically configuring a remainder of said plurality of memory banks to operate as on-chip level 2 cache memory based on said monitoring, wherein said one or more of said plurality of memory banks configured to operate as fast on-chip memory and said remainder of said plurality of memory banks configured to operate as on-chip level 2 cache memory are accessed via a common address line;
    comparing at least a portion of a memory address to one or both of said determined start address and said determined end address;
    selecting a plurality of tag addresses based on a set portion of said memory address;
    comparing each of said plurality of tag addresses to a tag portion of said memory address;
    selecting one or more memory locations within said one or more of said plurality of memory banks or within said remainder of said plurality of memory banks based on one or more of:
        said comparing at least a portion of a memory address to one or both of said determined start address and said determined end address;
        said comparing of each of said plurality of tag addresses to a tag portion of said memory address; and
        said corresponding one or more of a plurality of fast memory configuration bits; and
    outputting data from said selected one or more memory locations to a bus.

2. The method according to claim 1, comprising selecting said one or more locations within said one or more of said plurality of memory banks when said at least a portion of said memory address is greater than or equal to said determined start address and less than or equal to said determined end address.

3. The method according to claim 1, comprising determining a cache hit within said on-chip level 2 cache memory when one of said plurality of tag addresses is equal to said tag portion of said memory address.

4. The method according to claim 1, comprising generating one or more fast memory access bits based on said comparing at least a portion of said memory address to one or both of said determined start address and said determined end address.

5. The method according to claim 4, comprising selecting said one or more memory locations within said one or more of said plurality of memory banks based on said one or more fast memory access bits.

6. The method according to claim 1, wherein said one or more of said plurality of memory banks comprises at least a portion of on-chip level 1 cache memory.

7. The method according to claim 1, comprising configuring an on-chip memory controller based on one or more of said determined start address, said determined end address and said plurality of fast memory configuration bits.

8. The method according to claim 1, comprising enabling said selecting one or more memory locations within said one or more of said plurality of memory banks when disabling said selecting one or more memory locations within said remainder of said plurality of memory banks.

9. The method according to claim 1, comprising enabling said selecting one or more memory locations within said remainder of said plurality of memory banks when disabling said selecting one or more memory locations within said one or more of said plurality of memory banks.

10. The method according to claim 1, comprising allocating at least a portion of said one or more of said plurality of memory banks to one or more processors for use as general purpose memory.

11. The method according to claim 1, comprising determining whether a memory address received via said common address line is within a memory region associated with said one or more of said plurality of memory banks configured to operate as fast on-chip memory.

12. A system for configuring memory, the system comprising:
    one or more circuits that are operable to monitor a cache hit rate of a processor;
    said one or more circuits are operable to dynamically configure one or more of a plurality of memory banks integrated within a chip to operate as fast on-chip memory based on said monitoring and based on one or more of a determined start address, a determined end address and a corresponding one or more of a plurality of fast memory configuration bits;

said one or more circuits are operable to dynamically configure a remainder of said plurality of memory banks to operate as on-chip level 2 cache memory based on said monitoring, wherein said one or more of said plurality of memory banks configured to operate as fast on-chip memory and said remainder of said plurality of memory banks configured to operate as on-chip level 2 cache memory are accessed via a common address line;

said one or more circuits are operable to compare at least a portion of a memory address to one or both of said determined start address and said determined end address;

said one or more circuits are operable to select a plurality of tag addresses based on a set portion of said memory address;

said one or more circuits are operable to compare each of said plurality of tag addresses to a tag portion of said memory address;

said one or more circuits are operable to select one or more memory locations within said one or more of said plurality of memory banks or within said remainder of said plurality of memory banks based on one or more of:

said comparing at least a portion of a memory address to one or both of said determined start address and said determined end address;

said comparing of each of said plurality of tag addresses to a tag portion of said memory address; and said corresponding one or more of a plurality of fast memory configuration bits; and said one or more circuits are operable to output data from said selected one or more memory locations to a bus.

13. The system according to claim 12, wherein said one or more circuits are operable to select said one or more locations within said one or more of said plurality of memory banks when said at least a portion of said memory address is greater than or equal to said determined start address and less than or equal to said determined end address.

14. The system according to claim 13, wherein said one or more circuits are operable to allocate at least a portion of said one or more of said plurality of memory banks to one or more processors for use as general purpose memory.

15. The system according to claim 12, wherein said one or more circuits are operable to determine a cache hit within said on-chip level 2 cache memory when one of said plurality of tag addresses is equal to said tag portion of said memory address.

16. The system according to claim 12, wherein said one or more circuits are operable to generate one or more fast memory access bits based on said comparing at least a portion of said memory address to one or both of said determined start address and said determined end address.

17. The system according to claim 16, wherein said one or more circuits are operable to select said one or more memory locations within said one or more of said plurality of memory banks based on said one or more fast memory access bits.

18. The system according to claim 12, wherein said one or more of said plurality of memory banks comprises at least a portion of on-chip level 1 cache memory.

19. The system according to claim 12, wherein said one or more circuits are operable to configure an on-chip memory controller based on one or more of said determined start address, said determined end address and said plurality of fast memory configuration bits.

20. The system according to claim 12, wherein said one or more circuits are operable to enable said selecting one or more memory locations within said one or more of said plurality of memory banks when disabling said selecting one or more memory locations within said remainder of said plurality of memory banks.

21. The system according to claim 12, wherein said one or more circuits are operable to enable said selecting one or more memory locations within said remainder of said plurality of memory banks when disabling said selecting one or more memory locations within said one or more of said plurality of memory banks.

22. The system according to claim 12, wherein said one or more circuits are operable to determine whether a memory address received via said common address line is within a memory region associated with said one or more of said plurality of memory banks configured to operate as fast on-chip memory.

* * * * *